United States Patent [19]

Hasinger et al.

[11] 4,435,810
[45] Mar. 6, 1984

[54] SELF-SUPPORTING LASER DIFFUSER FLOW ENERGIZER

[75] Inventors: Siegfried H. Hasinger, Dayton, Ohio; James M. Howard, Wales, Wis.; David K. Miller, Camp Springs, Md.

[73] Assignee: The United States of America as represented by the Secretary of the Air Force, Washington, D.C.

[21] Appl. No.: 300,763

[22] Filed: Sep. 10, 1981

[51] Int. Cl.³ .............................................. H01S 3/22
[52] U.S. Cl. ....................................... 372/58; 372/63; 372/90
[58] Field of Search ...................... 372/58, 63, 90, 55, 372/89

[56] References Cited

U.S. PATENT DOCUMENTS

| 3,671,883 | 6/1972 | Smars | 331/94.5 |
| 3,908,175 | 9/1975 | Damm | 331/94.5 |
| 4,011,522 | 3/1977 | Falk | 331/94.5 |
| 4,206,429 | 6/1980 | Pinsley | 372/58 |
| 4,235,372 | 11/1980 | Salter | 372/58 |

OTHER PUBLICATIONS

AFWAL-TR-80-3028, "Analysis and Design of a Supersonic Radial Outflow System".
Technical Report AFWAL-TR-8-3029, "Experiments with a Supersonic Multi-Channel Radial Diffuser", by Siegfried H. Hasinger and Howard L. Toms, Jr., (Sep. 1980).

Primary Examiner—William L. Sikes
Assistant Examiner—Léon Scott, Jr.
Attorney, Agent, or Firm—Donald J. Singer; Bobby D. Scearce

[57] ABSTRACT

A self-supporting laser diffuser flow energizer is described for improving the performance of radial flow lasers by providing novel means for pressure recovery, and comprises a self-sustaining suction means communicating with the laser cavity for changing the supersonic shock front configuration existing within a radial laser diffuser and thereby promoting the flow of gaseous laser medium within the laser cavity.

4 Claims, 6 Drawing Figures

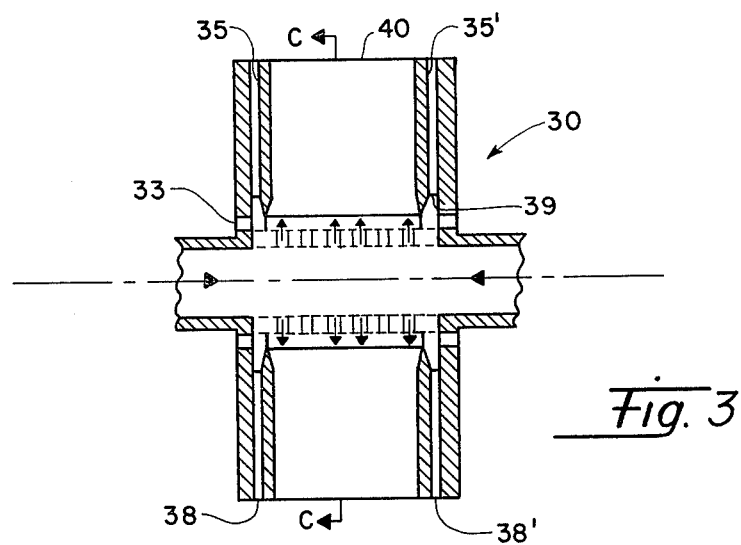

4,435,810

SELF-SUPPORTING LASER DIFFUSER FLOW ENERGIZER

RIGHTS OF THE GOVERNMENT

The invention described herein may be manufactured and used by or for the Government of the United States for all Governmental purposes without the payment of any royalty.

BACKGROUND OF THE INVENTION

This invention relates generally to new and useful improvements in laser systems, and more particularly to high energy radial flow lasers. Specifically, the invention herein provides improvements in radial flow diffusers in high energy radial flow lasers.

Existing high energy laser systems are extremely bulky, typically by reason of the requirements for storing, under pressure, gases required for laser operation, and by reason of auxiliary cooling means for the laser system. These considerations are acutely important for airborne high energy laser applications, since weight and space in airborne packages are at a premium. The radial flow high energy laser represents a significant advance in reducing the size of a high energy laser system, and may therefore provide a preferred system for airborne applications. The invention described herein, providing a self-supporting laser diffuser flow energizer, among other advantages described herein, provides the advantages of significantly improving pressure recovery in the diffusion region of the radial flow laser, and of further reducing the space requirements for high energy radial flow lasers by substantially reducing both the amount of gas consumed by the laser for a given level of performance and the space requirements for high pressure gas storage for the laser system.

Radial flow high energy lasers require for their use in airborne applications the conversion of the supersonic flow energy of the laser medium into pressure energy for discharging it to ambient. The high temperatures generated within the medium during laser operation require that any diffuser system used to accomplish that purpose must be cooled. Cooling requirements for the diffuser system impose considerable design constraints on the system, which are further complicated by the general space and weight considerations for airborne systems. Consequently, either the efficiency of laser medium recovery is poor, the flow uniformity in the laser cavity suffers, or an outside source of energy is required to remedy deficiencies.

The present invention eliminates, or significantly reduces in critical importance the problems of prior art radial flow high energy laser systems, by providing a supersonic diffuser system having a self-supporting suction capability for facilitating and improving the flow diffusion process in radial flow high energy lasers. Means are provided in the supersonic flow region of a radial flow laser diffuser, which provides a self-sustained suction, thereby improving the diffusion process. The suction means may be preferably provided on or near the diffuser walls since the worst flow deficiencies of the radial flow diffusion process occur near the diffuser walls. The geometry of these devices can be chosen freely to the best advantage of the diffusion process in the devices. The pressure recovery in these devices is therefore superior to that obtained for the rest of the flow passing through the laser diffuser. Since the pressure after diffusion is the same for the flow through the laser diffuser and through the suction devices, the superior pressure recovery in the suction devices has the effect that the pressure at the inlet to the suction devices is lower than in the rest of the flow, i.e. a suction effect is produced.

It is therefore an object of this invention to provide an improved radial flow laser.

It is another object of this invention to provide a radial flow laser having improved pressure recovery.

It is yet another object of this invention to provide an improved radial flow laser for airborne high energy laser applications.

These and other objects of the invention will become apparent as the detailed description thereof proceeds.

SUMMARY OF THE INVENTION

In accordance with the foregoing principles and objects of the present invention, a self-supporting laser diffuser flow energizer is described for improving the performance of radial flow lasers by providing novel means for pressure recovery, and comprises a self-sustaining suction means communicating with the laser cavity for changing the supersonic shock front configuration existing within a radial laser diffuser and thereby promoting the flow of gaseous laser medium within the laser cavity.

DESCRIPTION OF THE DRAWINGS

The invention will be more clearly understood from the following detailed description of specific embodiments thereof read in conjunction with the accompanying drawings wherein:

FIG. 3 is a schematic cross section of a radial flow laser cavity showing the application of an embodiment of the present invention to an axial vane diffuser.

DETAILED DESCRIPTION

Figure 1A:
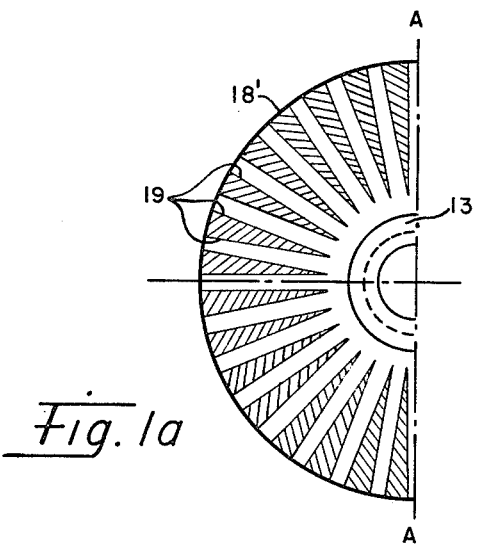
FIG. 1a is a sectional view of the diffuser of this invention taken along section line A—A of FIG. 1.
Figure 1:
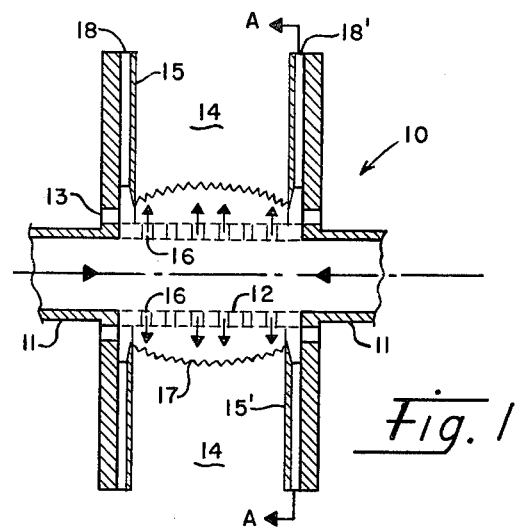
FIG. 1 is a schematic cross section of the supersonic radial flow portion of a radial flow laser cavity including one embodiment of the novel diffuser of this invention as applied to a radial flow laser having a barrel shock diffuser.
Figure 2A:
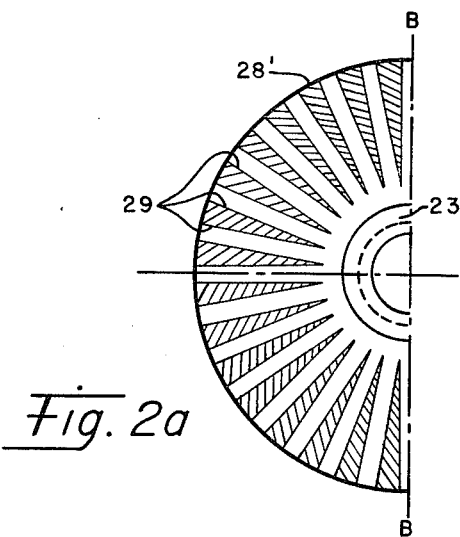
FIG. 2a is a sectional view of the novel diffuser of this invention taken along section line B—B of FIG. 2.
Figure 2:
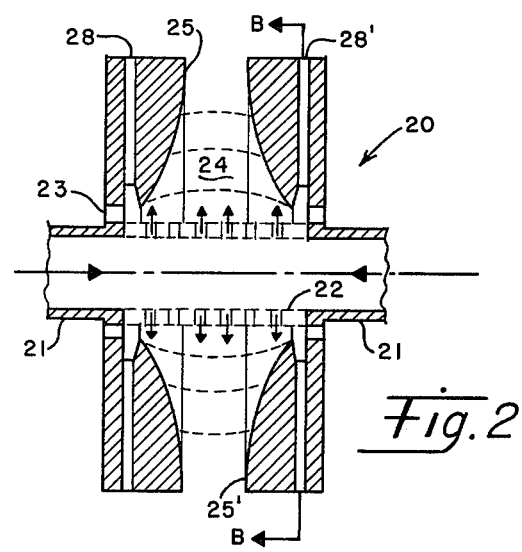
FIG. 2 is a schematic cross section of a radial flow laser cavity including another embodiment of the present invention as applied to a laser having a contoured wall diffuser.

Referring now to the drawings, FIGS. 1, 2 and 3 show three applications of the novel self-supporting laser diffuser flow energizer of the present invention. Each Figure shows a schematic partial cross section of the supersonic radial flow portion of a radial flow laser cavity, comprising, in general, a gaseous laser medium supply tube, a radial expansion means, a diffuser means, a laser cavity, and a self-supporting flow energizer of this invention. The separate embodiments of the invention shown in the accompanying Figures, are applied to three diffuser means, respectively, a barrel shock diffuser, contoured wall diffuser, and an axial vane diffuser. It is recognized at the outset that the invention described herein can be applied to other radial flow diffuser configurations as might occur to one with skill in the field of this invention, the same being contemplated hereunder as being within the scope of this invention.

In order to improve the flow conditions within the laser cavity of a radial flow laser system, the flow of the laser medium in the cavity should be as uniform as possible. For airborne applications the static pressure in the flow must be maintained at a level which is invariable below ambient pressure at common flight altitudes. A pressure recovery system is therefore needed for discharging the laser operating medium to the outside. Two factors make the pressure recovery in these laser devices inferior to commonly experienced performances of supersonic diffusers. First, radial flow laser systems have an axial length which is much larger than their inlet diameter. The resulting unfavorable cross section for the diffusing flow requires the use of devices such as axial vanes to subdivide the flow path into many small segments if an efficient recovery is to be achieved. Second, cooling is required for the diffuser walls and for any vanes inserted into the flow, which severely restricts the selection of vane geometry for the diffuser.

Considering first the embodiment of FIG. 1, the application of the present invention to the barrel shock diffuser is shown therein. The cavity of a radial flow diffuser laser system 10 is shown therein and comprises gaseous laser medium supply tube 11, radial expansion nozzle system 12, laser cavity 13 and diffusion chamber 14 defined by end walls 15—15'. The laser cavity as shown in the figures may be part of a complete gaseous laser system including means (not shown in the figures) for supplying the gaseous medium to the laser cavity, conventional means for supporting a laser discharge (such as electrical discharge), the optical resonant cavity of which the device shown in the figures is a part, and, means for exhausting the laser medium from the diffuser chamber 14. A gaseous medium which may be suitable for use with the invention herein may be any gaseous medium used conventionally such as containing carbon dioxide, helium, nitrogen, oxygen, or freon. Supply tube 11 may conduct incoming gaseous lasing medium to laser cavity 13 uniformly from both ends of supply tube 11, and typically carries gas at high pressure with low inlet velocity from high pressure gas storage (not shown). The flow is expanded radially outward into annular laser cavity 13 through the central nozzle system 12 consisting of a plurality of supersonic expansion nozzles 16. The diffusing flow preceeds radially outward into diffusion chamber 14 and to ambient, exhaust, or pumping means (not shown). The supersonic system which typically forms in this arrangement (called barrel shock diffuser) produces approximately 40% of normal shock pressure recovery. With no axial or radial subdividing vanes in the diffusing flow in diffusion chambers 14 cooling problems are minimal.

However, due to its barrel like shape, as demonstrated in FIG. 1 as barrel shock front 17, the shock system which forms in this configuration interferes with the flow within laser cavity 13 where the front 17 reaches end walls 15 and 15'. It was discovered, however, that the barrel shock contour could be deformed by providing suitable channeling or small tubing at or near end walls 15 and 15'. The channeling provides a suction effect which eliminates that portion of the shock front 17 at the end walls 15-15'. To generate the suction effect, flow energizers 18 and 18', shown in partial section along section A—A on FIG. 1a, and comprising a circular member having a plurality of radial grooves or channels 19, provide a plurality of channels of superior diffuser geometry through which exhaust (not shown) may communicate directly with the laser cavity 13. The pressure recovery in these channels or wall diffusers is superior to the pressure recovery obtained in the flow through the barrel shock, demonstrating that the wall diffuser or flow energizers 18 and 18' exert a suction effect on the main flow into the laser cavity 13. Thus, by inserting the flow energizer 18-18' as shown in FIG. 1, the portion of the barrel shock near end walls 15-15' may be eliminated due to the suction effect it provides. The suction effect is enhanced by providing the most advantageous flow geometry to the flow channels of the flow energizers 18-18'. The channels 19 provided in the flow energizers 18-18' as shown in FIGS. 1 and 1a have a substantially uniform rectangular shape, and extend radially from the laser cavity 13, in such arrangement that laser cavity 13 may communicaate with ambient through channels 19. However, channels 19 may be of any convenient cross-sectional shape within the scope of this invention so long as the purpose thereof as herein described is served. The energizers 18-18' are shown in FIG. 1 as being positioned adjacent the end walls 15-15' of the diffuser section 14 so that the grooves 19 define radially extending channels for communication of laser cavity 13 with ambient. Because the energizers 18-18' do not have significant thickness, their placement near end walls 15-15' facilitates cooling, and such placement is preferred, through not critical to the operation of the energizer.

FIG. 2 shows that pressure recovery in a vaneless radial diffuser configured as a contoured wall diffuser, may be enhanced by using the channeled energizer of this invention. As shown in FIG. 2, radial flow region of laser system 20 comprises supply tube 21, radial expansion system 22, laser cavity 23, and contoured wall diffuser chamber 24, operating similarly to like named components of FIG. 1. Channeled energizers 28-28' of this invention having grooves or channels 29 as shown in FIG. 2a, may be provided near the end walls 25-25' to define the channels through which laser cavity 23 may communicate with ambient or exhaust to provide the desired suction effect. For reasons discussed above in relation to FIG. 1, it is desirable to provide energizers 28-28' near the end walls 25-25' so that the flow conditions in the laser cavity 23 near end walls 25-25' are improved. The contour of the end walls 25-25' in system 20 of FIG. 2 adversely affects the flow conditions within the cavity 23 near the end walls 25-25' since the contouring imposes a strong axial component in the diffusing flow near the walls. The suction provided by including the channeled energizer 28-28' of this invention as demonstrated in FIG. 2 alleviates this problem.

Figure 3A:
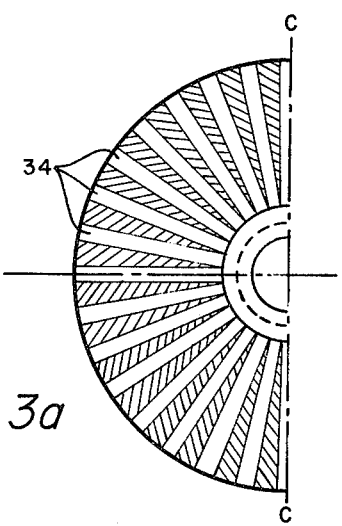
FIG. 3a is a sectional view of the diffuser as shown in FIG. 3 taken along section line C—C.

As shown in FIG. 3, radial flow laser system 30 features a plurality of axial vanes 40 defining a plurality of segmented chambers 34 with a high aspect ratio rectangular cross-section, in which the flow is diffused. This diffuser system is more effective for pressure recovery than the barrel shock diffuser of FIG. 1. The axial arrangement for the vanes 40 facilitates cooling, however the flow cross section which is generated between vanes 40 is extremely unfavorable for the shock diffusion process. Such a cross sectional shape requires boundary layer energization on the end walls 35-35' for starting and maintaining a diffusing flow. The flow energizer 38-38' of FIG. 3, provides boundary layer suction at the end walls 35-35' and reduces the need for externally applied pumping devices to promote the diffusion process. As shown in FIG. 3a the energizer 38-38' may comprise a plurality of radially extending grooves or channels 39 and may conveniently be located near end walls 35-35'. Laser cavity 33 may then communicate with ambient exhaust through the channels 39 of energizers 38-38'.

The present invention, as hereinabove described, therefore provides a self-supporting laser diffuser flow energizer for radial flow lasers. It is understood that the invention described herein may be alternately configured, such as to meet design criteria of various diffusers in radial flow lasers, as might occur to one with skill in the field of this invention. Therefore, all embodiments contemplated hereunder have not been shown in complete detail. Other embodiments may be developed without departing from the spirit of this invention or from the scope of the appended claims.

We claim:

1. In a radial flow gas laser having means defining a laser cavity and means adjacent said cavity for supplying gaseous laser medium to said cavity at supersonic velocity directed radially outward and transverse of said cavity and means defining a diffuser chamber adjacent said laser cavity for diffusing said supersonic flow to an exhaust, said chamber defining means including a pair of spaced end walls defining a space therebetween for confining said radially outward flow therebetween, an improvement, comprising, means, adjacent each said end wall, defining a plurality of radially outwardly directed channels through which said cavity communicates directly with said exhaust.

2. A radial flow gas laser as set forth in claim 1 wherein said channels are substantially uniform in cross section.

3. A radial flow gas laser as recited in claim 1 further comprising a plurality of vanes disposed in said space between said channel defining means and angularly spaced around said cavity, said vanes configured to define between adjacent vanes regions of substantially uniform cross section through which said outwardly directed radial flow is diffused.

4. A radial flow gas laser as recited in claim 1 wherein said channel defining means includes a plurality of radially extending tubes adjacent each said end walls.

* * * * *